United States Patent Office 3,117,121
Patented Jan. 7, 1964

3,117,121
PHENOXATHIINYL GLYOXAL DERIVATIVES
Elvin L. Anderson, Moorestown, N.J., assignor to Smith Kline & French Laboratories, Philadelphia, Pa., a corporation of Pennsylvania
No Drawing. Filed Jan. 30, 1961, Ser. No. 85,473
9 Claims. (Cl. 260—240)

This invention relates to novel phenoxathiinyl glyoxal derivatives. More specifically, this invention relates to mono- and bisglyoxalyl phenoxathiins and their corresponding hydrates, alcoholates, alkali metal bisulfite salts and carbonyl functional derivatives.

The novel phenoxathiinyl glyoxal derivatives of this invention are useful as antiviral agents, particularly in infections such as distemper virus, influenza virus ($PR_8$), hepatitis virus ($MHV_3$), neurotropic virus (CLM), Herpes simplex, adenovirus, Newcastle disease virus, Coxsackie virus Echo virus and hemadsorption virus; especially influenza and herpetic viruses. In addition, these compounds have a low order of toxicity.

The phenoxathiinyl glyoxal derivatives are represented by the following fundamental formula:

[Formula I]

where X represents S, SO or $SO_2$;
R represents hydrogen or $$-\overset{O}{\underset{\|}{C}}-R_1$$

and
$R_1$ represents

—CHO $$-\underset{\underset{SO_3M}{|}}{CH}-OH$$

where M is a nontoxic alkali metal, preferably sodium or potassium, $$-\underset{\underset{OR_2}{|}}{CH}-OH$$

where $R_2$ is hydrogen or a hydrocarbon radical containing from 1 to 12 carbon atoms inclusive, $$-Y-\!\!\!\bigcirc$$

where Y is $$-\underset{\underset{OR_2}{|}}{CH}-NH-$$

or —CH=N— and $R_2$ is a defined above, $$-Y-\!\!\!\underset{R_4}{\overset{COOR_3}{\bigcirc}}$$

where Y is as defined above,
$R_3$ is hydrogen or lower alkyl of from 1 to 4 carbon atoms and $R_4$ is hydrogen or hydroxy, $$-CH=N-\!\!\!\overset{S}{\bigcirc}$$

$$-CH=N-NH-CO-\!\!\!\bigcirc\!\!\!N$$

$$-CH=N-NH-CO-CH_2-\overset{\oplus}{N}\!\!\!\bigcirc \cdot Cl^{\ominus}$$

or $$-CH\!\left(NH-\!\!\!\overset{}{\bigcirc}\!\!-COOH\right)_2$$

Advantageous compounds of this invention are represented by the following fundamental formula:

[Formula]

where R represents hydrogen or $$-\overset{O}{\underset{\|}{C}}-R_1$$

and
$R_1$ represents

—CHO $$-\underset{\underset{SO_3Na}{|}}{CH}-OH$$

$$-\underset{\underset{OR_2}{|}}{CH}-OH$$

where $R_2$ is hydrogen, a lower saturated or unsaturated aliphatic hydrocarbon radical of from 1 to 8 carbon atoms, inclusive, or a benzyl radical, $$-Y-\!\!\!\bigcirc$$

where Y is $$-\underset{\underset{OR_2}{|}}{CH}-NH-$$

or —CH=N— and $R_2$ is as defined immediately above, $$-Y-\!\!\!\underset{R_4}{\overset{COOR_3}{\bigcirc}}$$

where Y is as defined immediately above, $R_3$ is hydrogen or lower alkyl of from 1 to 4 carbon atoms and $R_4$ is hydrogen or hydroxy, $$-CH=N-\!\!\!\overset{S}{\bigcirc}$$

or $$-CH(NH-\!\!\!\overset{}{\bigcirc}\!\!-COOH)_2$$

Preferred compounds of this invention are represented by Formula II above where
R represents hydrogen or $$-\overset{O}{\underset{\|}{C}}-R_1$$

and
$R_1$ represents $$-\underset{\underset{OH}{|}}{CH}-OH$$

$$-Y-\!\!\!\overset{}{\bigcirc}\!\!-COOH$$

where Y is $$-\underset{\underset{OR_2}{|}}{CH}-NH-$$

or —CH=N— and $R_2$ is hydrogen or lower alkyl of from 1 to 8 carbon atoms, particularly methyl or ethyl, or $$-CH(NH-\!\!\!\overset{}{\bigcirc}\!\!-COOH)_2$$

The phenoxathiinyl glyoxals of this invention are readily prepared from the corresponding mono- or diacetyl phenoxathiins by oxidation with an agent such as selenium dioxide. The acetyl phenoxathiins are obtained by a Friedel-Crafts acylation with acetyl chloride under standard conditions (aluminum chloride in carbon disulfide).

The mono- or diacetyl phenoxathiin is reacted with selenium dioxide in a suitable organic solvent such as dioxane, tetrahydrofuran, acetone, ethanol, benzene and the like. Theoretically one or two moles of selenium dioxide is required for one mole of mono- or diacetyl phenoxathiin, respectively. However, an excess such as from about 1.25 to about 5 moles or from about 3 to about 7 moles of oxidizing agent is employed for each mole of starting material. The reaction is carried out at a temperature in the range of from about 30° C. up to the boiling point of the solvent used and for from about 30 minutes to 8 hours. Preferably by the reaction is carried out at from about 50–100° C. for about 1 to 6 hours. Filtering the reaction mixture and adding water to the filtrate yields the phenoxathiinyl glyoxal hydrates. Oxidation under anhydrous conditions such as in anhydrous dioxane, yields the anhydrous glyoxals.

Alternatively, the phenoxathiinyl glyoxals are prepared from corresponding mono- or bis-haloacetyl or dihaloacetyl phenoxathiins which are obtained by Friedel-Crafts acylation with haloacetyl or dihaloacetyl halide. Preferably the halogen is chlorine or bromine. Also, the dihaloacetyl derivatives are prepared by direct halogenation of the mono- or diacetyl phenoxathiin, preferably with chlorine or bromine, in an unreactive organic solvent such as chloroform, carbon tetrachloride, methylene chloride and the like, or preferably glacial acetic acid. The haloacetyl phenoxathiin is converted to the glyoxal via the Sommelet reaction, that is refluxing the halide with hexamethylenetetramine followed by decomposition of the quaternary ammonium salt with water. The dihaloacetyl phenoxathiin is converted to the glyoxal by reaction with an alkali metal alcoholate such as sodium or potassium methylate or ethylate in a suitable solvent, usually anhydrous lower alcohols, to form the corresponding glyoxalyl acetal derivatives. The reaction is preferably run at about 40–60° C. for from 1–3 hours with the reaction mixture maintained at pH 7. The acetal compound is then hydrolyzed with dilute acid such as 3% sulfuric or hydrochloric acid in a suitable solvent such as acetic acid to form the glyoxalyl derivative.

The phenoxathiinyl glyoxal sulfoxide and sulfones of this invention are prepared by standard oxidation of the mono- or diacetyl phenoxathiins with hydrogen peroxide followed by oxidation of the acetyl moiety as described above with selenium dioxide.

The hydrate or alcoholate derivatives of this invention are prepared from the anhydrous glyoxal by reaction with water or an alcohol, usually at room or slightly elevated temperature such as up to about 100° C. for about 10 minutes to about 10 hours.

The alcoholates are advantageously prepared by reacting the anhydrous glyoxal or hydrate thereof with an alcohol, usually in an excess of the alcohol with gentle heating between from about 50° C. to about 80° C. Alternatively, the glyoxal hydrate can be heated in an excess of an anhydrous alcohol with azeotropic removal of the water formed employing an organic solvent such as benzene, xylene or toluene, to give the desired alcoholate.

The phenoxathiinyl glyoxal alkali metal bisulfite salts of this invention are prepared by reacting the glyoxal, anhydrous or hydrated with approximately an equimolar amount of preferably sodium or potassium bisulfite.

The aminocarbinol derivatives of Formula I where Y is

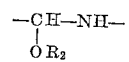

are prepared by condensing the phenoxathiinyl glyoxal alcoholate with an aniline, aminobenzoic acid or aminosalicylic acid, or lower alkyl esters thereof, with elimination of water. Advantageously, approximately molar equivalent amounts of the glyoxalyl alcoholate and the amino reactant (2 moles per 1 mole of bisglyoxalyl phenoxathiin) in an inert organic solvent are reacted at from about 25° C. to about the boiling point of the solvent employed for from about 15 minutes to about 24 hours. Preferably the reaction time is from about 30 minutes to 8 hours at temperatures from about 40°–100° C. Using the glyoxalyl alcoholate as the starting material, it is advantageous to use the corresponding anhydrous alcohol as the reaction solvent. It is often advantageous to prepare the glyoxalyl alcoholate in situ from the corresponding hydrate by a brief reflux in the desired alcohol in the presence of sulfuric acid. The aminocarbinol condensation derivative is usually isolated by filtration or evaporation of the solvent.

The methyleneimino derivatives of Formula I where Y is —CH=N— are prepared by decomposition of the corresponding aminocarbinol derivatives prepared as described above. The decomposition is accomplished by heating the aminocarbinol to a temperature of from about 70° C. to about 140° C., preferably under reduced pressure of about 0.01–15 mm. of mercury and in the absence of solvent in an anhydrous atmosphere. Although the time necessary for decomposition is variable, at 100–120° C. and a pressure of 0.1–15 mm. of mercury the reaction is complete in about 1–10 hours. Alternatively the decomposition is accomplished at atmospheric pressure by infrared heating at 100–150° C.

The methyleneimino derivatives are alternatively prepared by reacting the anhydrous phenoxathiinyl glyoxal with an aniline, aminobenzoic acid or aminosalicylic acid, or lower alkyl esters thereof. The reaction is carried out in the absence of solvents or in an inert, anhydrous organic solvent such as toluene or xylene. In the absence of a solvent, the reaction is carried out at from about 90°–125° C. for from about 6–10 hours. When a solvent is employed the reaction is conveniently run at the reflux temperature of the solvent for from about 6–10 hours.

The cyclohexyliminomethylene derivatives of Formula I are prepared by condensing either the phenoxathiinyl glyoxal or its alcoholate or hydrate with cyclohexylamine in a suitable organic solvent such as a lower alkanol, an ether for example ethyl ether, dioxane or tetrahydrofuran, a hydrocarbon for example benzene or toluene, or a halogenated solvent for example chloroform, carbon tetrachloride and the like. Preferably the solvent is a lower alkanol, especially isopropyl alcohol. The condensation is advantageously carried out at relatively low temperatures such as from about —10° C. to about 40° C. for from about 10–60 minutes. The product is isolated by filtration or evaporation of the solvent.

The isonicotinoyl hydrazone derivatives of Formula I are prepared by condensing either the phenoxathiinyl glyoxal or its alcoholate or hydrate with isonicotinic acid hydrazide in an organic solvent of the alcoholic type or in an inert one such as ether, benzene, dioxane, tetrahydrofuran and the like. The reaction temperature is in the range of from 20–25° C. up to the boiling point of the solvent employed, preferably between about 50° C. and 100° C. Generally the reaction is complete in about 2–8 hours with the product isolated by filtration of the precipitate.

The methinylhydrazidomethylpyridinium chloride derivatives of Formula I are prepared by condensing either the phenoxathiinyl glyoxal or its alcoholate or hydrate with acethydrazide pyridinium chloride in an unreactive organic solvent, preferably a lower alkanol, for example methanol, ethanol or isopropanol. Advantageously a condensing agent such as acetic acid is present. The reaction is usually complete in from about 30 minutes to about four hours at the reflux temperature of the solvent employed. The product is isolated by cooling or by evaporation of the solvent.

The bis aminobenzoic acid adducts of Formula I are prepared by condensing either the phenoxyathiinyl glyoxal or its hydrate with an excess of the aminobenzoic acid in preferably an alcoholic type solvent, for example methanol or ethanol. The reaction is usually carried out at the reflux temperature of the solvent for from 30 minutes to 8 hours. The product is isolated by cooling and filtering.

The novel compounds of this invention described fully above are useful as prophylactic agents and chemotherapeutic drugs for the treatment of viral infections and diseases. Some of these compounds also have a specialized utility. For example the methinylhydrazidomethylpyridinium salts are very water soluble thereby lending themselves in particular to subcutaneous administration or topical applications, for example in the form of a collyrium. Further the isonicotinoyl hydrazones are particularly useful in the treatment of viral infections and diseases of the skin and eyes.

From the above description it is obvious that one skilled in the art can design minor variations of this invention. Such variations are intended to be included in the scope of this invention as equivalents to the basic invention herein fully described. For example the compounds of Formula I where $R_1$ represents

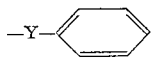

the benzene ring may be substituted by nitro, sulfamido, amino, methylamino, acetylamino, hydroxy, methoxy, acetoxy, halogen or methyl radicals and the like. Further, in addition to the methinylhydrazidomethylpyridinium chloride derivatives of Formula I other methinylhydrazidomethyl quaternary salts may be employed such as trimethylammonium, methylpyridinium, methylpyrrolidinium, methylmorpholinium, methyl- and dimethyl-N-methyl-piperazinium chlorides or bromides. In general, $R_1$ as described represents aldehydo derived moieties having a maximum of 20 carbon atoms.

The following specific examples are not limiting but illustrate the novel compounds of this invention and make fully apparent the practice of this invention to one skilled in the art.

*Example 1*

To a solution of 82 g. of 2-acetylphenoxathiin in 340 ml. of dioxane and 10 ml. of water is added 39.4 g. of selenium dioxide. The mixture is refluxed for one and one-half hours and then cooled to 25° C. and filtered. The filtrate is diluted with one liter of water to precipitate phenoxathiin-2-glyoxal hydrate which after recrystallization from aqueous acetic acid melts at 130–132° C.

Similarly, running the above reaction in anhydrous dioxane under anhydrous conditions, filtering the reaction hot followed by partial evaporation and cooling yields the anhydrous phenoxathiin-2-glyoxal.

*Example 2*

A mixture of 10.0 g. of phenoxathiin-2-glyoxal hydrate in 150 ml. of absolute ethyl alcohol is heated at reflux for several hours. The clear solution is evaporated slightly and then cooled to give phenoxathiin-2-glyoxal ethylate.

Similarly, by following the above procedure 10.0 g. of phenoxathiin-2-glyoxal hydrate is reacted with an excess of other alcohols to give the corresponding methylate, n-propylate, isopropylate, n-butylate, allylate, propargylate and the like of phenoxathiin-2-glyoxal.

*Example 3*

To suspension of 22.5 g. of phenoxathiin-2-glyoxal hydrate in 240 ml. of dioxane is added 11.5 g. of sodium bisulfite dissolved in 70 ml. of water. The mixture is heated on the steam bath for 20 minutes, cooled to 10° C. and then filtered. The phenoxathiin-2-glyoxal sodium bisulfite salt is washed with water and the acetone, M.P. 205° C.

*Example 4*

To 13.7 g. of phenoxathiin-2-glyoxal hydrate in 125 ml. of ethanol is added one drop of concentrated sulfuric acid. The mixture is refluxed for 15 minutes to form the phenoxathiin-2-glyoxal ethylate and then 6.7 g. of p-aminobenzoic acid is added. The refluxing is continued for 30 minutes and the precipitated solid is filtered hot to give the ethyl ether of α-(2-phenoxathiinoyl)-α-(4-carboxyphenylamino)-carbinol.

A portion of the ethyl ether (500 mg.) is dissolved in water containing one molar equivalent of sodium hydroxide to give the sodium salt upon evaporation.

Similarly, reacting any of the alcoholates of Example 2 according to the above procedure with one molar equivalent of p-aminobenzoic acid gives the corresponding ethers of α - (2 - phenoxathiinoyl) - α - (carboxyphenylamino)-carbinol.

*Example 5*

The ethyl ether of α-(2-phenoxathiinoyl)-α-(4-carboxyphenylamino)-carbinol (5.0 g., Example 4) is heated in a vacuum oven at 0.1 mm. and 105° C. for four hours to give after washing with acetone the product p-(2-phenoxathiinylglyoxylidineimino)-benzoic acid. The hemihydrate melts at 208–210° C.

*Example 6*

A solution of 10.0 g. of 2-acetylphenoxathiin in 100 ml. of acetic acid is treated with an excess of hydrogen peroxide and warmed to 40° C. Diluting the mixture with water precipitates 2-acetylphenoxathiinyl sulfone.

The filtered sulfone is dissolved in 125 ml. of glacial acetic acid with heating and then cooled to 50° C. Chlorine gas is then bubbled into the mixture for four hours until the theoretical amount of chlorine is dissolved. The reaction mixture is poured into water and extracted with methylene chloride. Evaporation of the dried extract yields 2-dichloroacetylphenoxathiinyl sulfone.

A solution of the dichloroacetyl sulfone (5.0 g.) is dissolved in 75 ml. of hot anhydrous methanol and treated with a solution of 1.0 g. of sodium in 25 ml. of methanol. After four hours at 45–50° C. the reaction mixture is neutral to phenolphthalein and the sodium chloride is filtered off. Evaporation of the solvent gives the residual 2-glyoxalylphenoxathiin sulfone methyl acetal. The acetal is dissolved in 50 ml. of acetic acid at 50° C. and 3 ml. of 3% sulfuric acid is added. Water is added and the precipitate water-washed to give 2-glyoxalylphenoxathiin sulfone hydrate.

Similarly, by following the above procedure 10.0 g. of 2-acetylphenoxathiin in 100 ml. of acetic acid is oxidized at ambient temperature with one molar equivalent of hydrogen peroxide to give 2-acetylphenoxathiin sulfoxide which is converted to 2-glyoxalylphenoxathiin sulfoxide.

*Example 7*

A solution of 14.2 g. of 2,8-diacetylphenoxathiin in 125 ml. of dioxane and 5 ml. of water is treated with 11.5 g. of selenium dioxide and then refluxed for two hours. The cooled reaction mixture is filtered and the filtrate diluted with water to precipitate 2,8-bisglyoxalylphenoxathiin hydrate.

Reacting the above phenoxathiin with an excess of sodium bisulfite in water-dioxane as in Example 3 yields the corresponding bis sodium bisulfite salt.

*Example 8*

A mixture of 5.0 g. of 2,8-bisglyoxalylphenoxathiin hydrate and 100 ml. of anhydrous n-octyl alcohol in 250 ml. of anhydrous benzene is heated at reflux for 12 hours over a water trap (Org. Syn. 3, 382) having an inner funnel containing a mixture of phosphorus pentoxide and a filter aid. The mother liquor is then concentrated in vacuo to give the bis n-octylate of 2,8-bisglyoxalylphenoxathiin.

Similarly, by following the above procedure 5.0 g. of 2,8-bisglyoxalylphenoxathiin hydrate is reacted with an excess of other alcohols to give the corresponding bis n-hexylate, cyclohexylate, citronellylate, phenylate and benzylate of 2,8-bisglyoxalylphenoxathiin.

*Example 9*

A solution of 14.4 g. of phenoxathiin-2-glyoxal methylate (prepared as in Example 2) in 150 ml. of methanol is treated with 40.7 g. of aniline and refluxed for one hour. Cooling separates the methyl ether of α-(2-phenoxathiinoyl)-α-(phenylamino)-carbinol.

Similarly, reacting any of the alcoholates of Example 2 as described above with one molar equivalent of aniline gives the corresponding ethers of α-(2-phenoxathiinoyl)-α-(phenylamino)-carbinol.

*Example 10*

A mixture of 12.8 g. of anhydrous phenoxathiin-2-glyoxal (Example 1), 4.7 g. of aniline and 250 ml. of anhydrous xylene is heated at reflux for 8–10 hours. The precipitate is filtered and dried to give 2-phenylimino-glyoxylidinephenoxathiin.

*Example 11*

A mixture of 15.1 g. of phenoxathiin-2-glyoxal ethylate (Example 2) and 8.3 g. of ethyl p-aminobenzoate in 300 ml. of ethanol is heated at reflux for three hours. Evaporation of the solvent and cooling separates the ethyl ether of α-(2-phenoxathiinoyl)-α-(4 - carbethoxyphenylamino)-carbinol.

*Example 12*

A mixture of 12.8 g. of anhydrous phenoxathiin-2-glyoxal (Example 1), 6.9 g. of o-aminobenzoic acid and 200 ml. of anhydrous toluene is refluxed for 10 hours. The precipitate obtained is o-(2-phenoxathiinylglyoxalidineimino)-benzoic acid.

*Example 13*

A mixture of 13.7 g. of phenoxathiin-2-glyoxal hydrate (Example 1) and 6.9 g. of p-aminobenzoic acid in 100 ml. of benzene is warmed on the steam bath for two hours to give α-(2-phenoxathiinoyl)-α-(4-carboxyphenylamino)-carbinol.

*Example 14*

A solution of 2.7 g. of phenoxathiin-2-glyoxal hydrate and 1.5 g. of p-aminosalicylic acid in 75 ml. of tetrahydrofuran is refluxed for three hours, cooled and filtered to give α-(2-phenoxathiinoyl)-α-(4-carboxy-3-hydroxyphenylamino)-carbinol.

Similarly, reacting 2.7 g. of phenoxathiin-2-glyoxal hydrate and 1.67 g. of methyl p-aminosalicylate yields α-(2-phenoxathiinoyl) - α - (4 - carbomethoxy - 3 - hydroxyphenylamino)-carbinol.

*Example 15*

To a solution of 3.0 g. of phenoxathiin-2-glyoxal ethylate in 50 ml. of anhydrous ethanol is added 1.5 g. of p-aminosalicylic acid and the mixture is refluxed for four hours. Cooling yields the crystalline α-(2-phenoxathiinoyl)-α-(4-carboxy-3 - hydroxyphenylamino) - carbinol ethyl ether.

A portion of the ethyl ether (500 mg.) is dissolved in one molar equivalent of aqueous sodium hydroxide solution and then evaporated to give the sodium salt.

*Example 16*

A solution of 3.5 g. of 2,8-bisglyoxalylphenoxathiin hydrate (Example 7) in 150 ml. of absolute ethyl alcohol is heated at reflux for four hours, concentrated and cooled to give 2,8-bisglyoxalylphenoxathiin diethylate.

*Example 17*

To a solution of 4.0 g. of 2,8-bisglyoxalylphenoxathiin diethylate (Example 16) in 100 ml. of ethanol is added 3.3 g. of p-aminobenzoic acid and the mixture is heated at reflux for six hours. Cooling and filtering the reaction mixture yields 2,8-bis[α-ethoxy-α - (4 - carboxyphenylamino)-acetyl]-phenoxathiin.

*Example 18*

The ethyl ether of α-(2-phenoxathiinoyl)-α-(4-carboxy-3-hydroxyphenylamino)-carbinol (1.0 g., Example 15) is heated at 0.1 mm. and 100–110° C. for four hours to give o-hydroxy-p-(2 - phenoxathiinylglyoxylidineimino)-benzoic acid.

*Example 19*

A solution of 2.7 g. of phenoxathiin-2-glyoxal hydrate in 15 ml. of isopropanol is cooled to 0° C. and treated with a solution of 1.0 g. of cyclohexylamine in 5 ml. of isopropanol. After stirring at this temperature for one hour, the reaction mixture is concentrated in vacuo and the precipitate filtered to yield 2-cyclohexyliminoglyoxylidinephenoxathiin.

Similarly, reacting 3.5 g. of 2,8-bisglyoxalylphenoxathiin hydrate with 2.0 g. of cyclohexylamine at 0° C. yields the corresponding 2,8-bis-(cyclohexyliminoglyoxylidine)-phenoxathiin.

*Example 20*

A mixture of 2.7 g. of phenoxathiin-2-glyoxal hydrate and 1.37 g. of isonicotinic acid hydrazide in 100 ml. of ethanol is refluxed for three hours. Cooling separates the crystalline isonicotinoyl hydrazone of phenoxathiin-2-glyoxal.

Similarly, reacting 3.5 g. of 2,8-bisglyoxalylphenoxathiin hydrate with 2.7 g. of isonicotinic acid hydrazide yields the bis isonicotinoyl hydrazone of 2,8-bisglyoxalylphenoxathiin.

*Example 21*

A mixture of 2.7 g. of phenoxathiin-2-glyoxal hydrate, 2.0 g. of acethydrazide pyridinium chloride, 5 ml. of glacial acetic acid and 25 ml. of absolute ethanol is heated at reflux for three hours. The mixture is concentrated and cooled to give the solid [2-phenoxathiinoyl)-methinylhydrazidomethyl]pyridinium chloride.

Similarly, reacting 2.7 g. of phenoxathiin-2-glyoxal hydrate as described above with 1.8 g. of acethydrazide trimethylammonium chloride yields [(2-phenoxathiinoyl)methinylhydrazidomethyl]trimethylammonium chloride.

*Example 22*

A mixture of 3.5 g. of 2,8-bisglyoxalylphenoxathiin hydrate, 4.0 g. of acethydrazide pyridinium chloride, 5 ml. of acetic acid and 50 ml. of ethanol is refluxed for two hours, concentrated and cooled to yield 2,8-bis-(carbonylmethinylhydrazidomethylpyridinium chloride)-phenoxathiin.

*Example 23*

A mixture of 2.6 g. of phenoxathiin-2-glyoxal and 2.0 g. of p-aminobenzoic acid in 100 ml. of ethanol is heated at reflux for two hours. The reaction mixture is cooled and filtered. The solid product is washed with acetone to yield pure 2-[bis-(4-carboxyphenylamino)acetyl]-phenoxathiin.

*Example 24*

The 2,8 - bis[α-ethoxy-α-(4-carboxyphenylamino)-acetyl]-phenoxathiin of Example 17 (1.5 g.) is heated at 0.1 mm. and 100–110° C. for six hours to yield 2,8-bis[(4-carboxyphenyl)-iminoglyoxylidine]-phenoxathiin.

*Example 25*

To 15.3 g. of 2-glyoxalylphenoxathiin sulfone hydrate (Example 6) in 150 ml. of ethanol is added one drop of concentrated sulfuric acid. The mixture is refluxed for 30 minutes to form the 2-glyoxalylphenoxathiin sulfone ethylate and then 6.7 g. of p-aminobenzoic acid is added. The refluxing is continued for one hour and the solid filtered off to give 2-[α-ethoxy-α-(4-carboxyphenylamino)-acetyl]-phenoxathiin sulfone.

Example 26

A solution of 2.7 g. of phenoxathiin-2-glyoxal ethylate (Example 2) in 50 ml. of methanol is treated with 1.4 g. of p-nitroaniline and refluxed for two hours. Cooling separates the ethyl ether of α-(2-phenoxathiinoyl)-α-(4-nitrophenylamino)-carbinol.

Similarly, reacting 2.7 g. of phenoxathiin-2-glyoxal ethylate as described above with 1.1 g. of p-amino-aniline, 1.1 g. of p-hydroxyaniline or 1.6 g. of 3,4-dichloro-aniline yields the corresponding amino-, hydroxy- or 3,4-dichloro-phenylamino phenoxathiinoyl carbinol ethyl ethers.

What is claimed is:

1. A chemical compound having the formula:

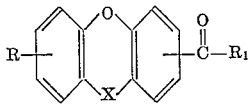

in which X is a member selected from the group consisting of S, SO and SO$_2$; R is a member selected from the group consisting of hydrogen and

and R$_1$ is a member selected from the group consisting of —CHO,

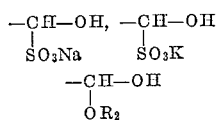

in which R$_2$ is a member selected from the group consisting of hydrogen, alkyl containing from 1 to 12 carbon atoms inclusive and benzyl,

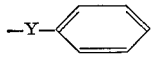

in which Y is a member selected from the group consisting of

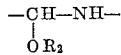

and —CH=N— and R$_2$ is as defined above,

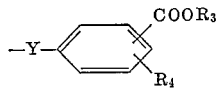

in which Y is as defined above and R$_3$ is a member selected from the group consisting of hydrogen and lower alkyl having from 1 to 4 carbon atoms and R$_4$ is a member selected from the group consisting of hydrogen and hydroxy,

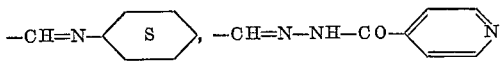

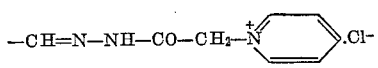

and

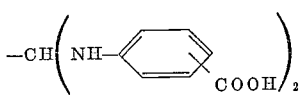

2. A chemical compound having the formula:

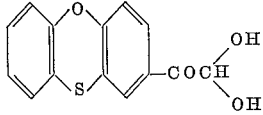

3. A chemical compound having the formula:

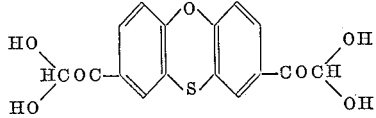

4. A chemical compound having the formula:

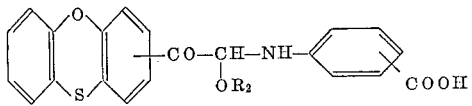

in which R$_2$ is alkyl containing from 1 to 8 carbon atoms inclusive.

5. A chemical compound having the formula:

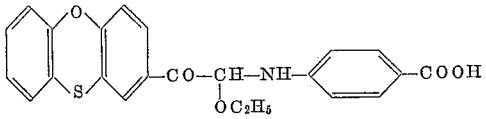

6. A chemical compound having the formula:

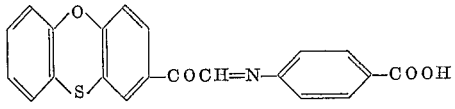

7. A chemical compound having the formula:

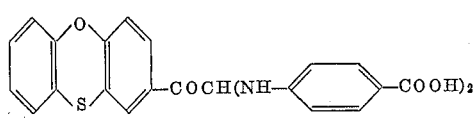

8. A chemical compound having the formula:

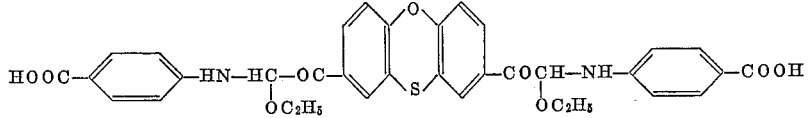

9. A chemical compound having the formula:

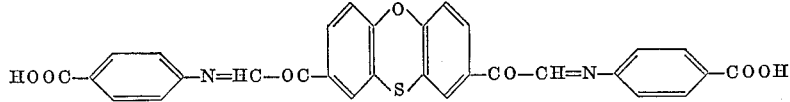

References Cited in the file of this patent

UNITED STATES PATENTS 2,451,818   Flowers et al. _____ Oct. 19, 1948

OTHER REFERENCES

Lescot et al.: Jour. Chem. Soc. (London), 1956, pages 2408–11.

Deasy: Chemical Reviews, Vol. 32, pages 173–93, April 1943.